(12) United States Patent
Sato et al.

(10) Patent No.: US 9,069,193 B2
(45) Date of Patent: Jun. 30, 2015

(54) OPTICAL WAVEGUIDE DEVICE, OPTICAL INTERFEROMETER, AND METHOD FOR PRODUCING OPTICAL WAVEGUIDE DEVICE

(75) Inventors: Kenji Sato, Tokyo (JP); Mineto Satoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/122,768

(22) PCT Filed: May 31, 2012

(86) PCT No.: PCT/JP2012/064608
§ 371 (c)(1),
(2), (4) Date: Nov. 27, 2013

(87) PCT Pub. No.: WO2012/165656
PCT Pub. Date: Dec. 6, 2012

(65) Prior Publication Data
US 2014/0099053 A1 Apr. 10, 2014

(30) Foreign Application Priority Data
Jun. 1, 2011 (JP) .................................. 2011-123204

(51) Int. Cl.
*G02F 1/035* (2006.01)
*G02F 1/01* (2006.01)
*G02F 1/225* (2006.01)

(52) U.S. Cl.
CPC .............. *G02F 1/011* (2013.01); *G02F 1/0123* (2013.01); *G02F 1/225* (2013.01)

(58) Field of Classification Search
CPC .... G02F 1/01; G02F 2001/212; G02F 1/0316
USPC ................... 385/3, 9; 341/137; 398/158, 198; 356/464
See application file for complete search history.

(56) References Cited

U.S. PATENT DOCUMENTS

| | | | |
|---|---|---|---|
| 5,137,359 A * | 8/1992 | Steele ........................... | 356/464 |
| 7,515,778 B2 * | 4/2009 | Mosinskis et al. ................ | 385/3 |
| 7,720,392 B2 * | 5/2010 | Nakashima et al. .......... | 398/198 |
| 8,320,720 B2 * | 11/2012 | Webster et al. ................. | 385/14 |
| 8,797,198 B2 * | 8/2014 | Ehrlichman et al. .......... | 341/137 |
| 2012/0082465 A1 * | 4/2012 | Akiyama et al. .............. | 398/158 |
| 2012/0301071 A1 * | 11/2012 | Kung et al. ....................... | 385/9 |

FOREIGN PATENT DOCUMENTS

| | | |
|---|---|---|
| JP | H7-49473 A | 2/1995 |
| JP | H10-228006 A | 8/1998 |
| JP | 2001-209018 A | 8/2001 |

(Continued)

OTHER PUBLICATIONS

International Search Report for PCT Application No. PCT/JP2012/064608, mailed on Jul. 10, 2012.

*Primary Examiner* — Ellen Kim
(74) *Attorney, Agent, or Firm* — Sughrue Mion, PLLC

(57) ABSTRACT

In order to independently perform control of a phase difference and a loss of light transmitting through an optical waveguide in a simple and easy configuration, an optical waveguide device includes an optical waveguide provided with two electrodes each supplied with a corresponding one of two signals; and a control unit for controlling the two signals so as to cause a phase variation and a loss variation which are caused in light transmitting through the optical waveguide by the two signals to each have a predetermined value.

7 Claims, 10 Drawing Sheets

(56) References Cited

FOREIGN PATENT DOCUMENTS

| JP | 2007-57782 A | 3/2007 |
| JP | 3974792 B2 | 9/2007 |
| JP | 2010-72462 A | 4/2010 |
| JP | 2011-247926 A | 12/2011 |

* cited by examiner

OPTICAL WAVEGUIDE DEVICE, OPTICAL INTERFEROMETER, AND METHOD FOR PRODUCING OPTICAL WAVEGUIDE DEVICE

This application is a National Stage Entry of PCT/JP2012/064608 filed on May 31, 2012, which claims priority from Japanese Patent Application 2011-123204 filed on Jun. 1, 2011, the contents of all of which are incorporated herein by reference, in their entirety.

TECHNICAL FIELD

The present invention relates to an optical waveguide device, an optical interferometer and a control method for an optical waveguide device.

BACKGROUND ART

In optical communication systems, large-capacity transmission based on high-speed transmission and wavelength multiplexing has been promoted. Particularly, in optical communication systems for trunk line, wavelength multiplexing communication has been widely used. In the wavelength multiplexing communication, a wavelength channel interval is prescribed and when the wavelength channel interval within a band of an optical fiber amplifier is 50 GHz, it is possible to use approximately one hundred channels.

Here, when representing a channel interval by $\Delta f$ [Hz] and representing a transmission rate by B [bit/s], B/$\Delta f$ [bit/s/Hz] is called a frequency efficiency. For example, when $\Delta f$=50 GHz and a transmission rate per channel is 100 Gbit/s, the frequency efficiency results in 2 bit/s/Hz.

Because the amplification band of the optical fiber amplifier is limited, in order to transmit a larger amount of information within a fixed band, it is necessary to enhance the frequency efficiency. Meanwhile, merely increasing the bit rate of a signal in order to enhance the frequency efficiency leads to a problem of cross talk between the channels. Thus, as next generation optical communication formats, an optical multiple-value modulation format and an optical orthogonal frequency-division multiplexing (OFDM) method have been considered.

The optical multiple-value modulation format increases information amount without expanding a frequency band by associating each of the amplitude and the phase of light with, not two values, that is, "0" and "1", but multiple values. Further, in the optical OFDM, an OFDM signal, which is generated on an electric signal basis, is optical-modulated, and the optical-modulated OFDM signal is multiplexed under the state where optical subcarriers are each caused to be in a mutually orthogonal state. Thus, the optical OFDM enables reduction of the occurrence of problems due to the cross talk, and enhancement of the frequency efficiency.

Through such processing based on electric signals, digital data to be modulated is subjected to a multiple-value conversion process and a multiplexing process, and is transmitted. The transmitted light signal is demodulated into an electric signal at a receiving end.

In an optical modulation circuit of an optical transmitter, a digital/analog (D/A) converter and an optical modulator are needed in order to convert the digital data which is an electric signal into an optical analog signal waveform.

As an optical modulator used when performing such a complicated optical modulation as described above, there is a Mach-Zehnder interferometer. The Mach-Zehnder interferometer is realized as an optical waveguide using, for example, lithium niobate (LiNbO3) as the material. Hereinafter, a modulator configured by the Mach-Zehnder interferometer using the lithium niobate as the material will be referred to as an "LN modulator".

FIG. 12 illustrates a block diagram of the LN modulator in relation to the present invention. Light is inputted from an optical input port 2 of an LN modulator 300 to an optical divider 3, and lights divided by the optical divider 3 is outputted to a first optical waveguide 4 and a second optical waveguide 5. An electrode is formed on part of each of the first optical waveguide 4 and the second optical waveguide 5. Further, it is possible to, with respect to each of the optical waveguides, vary the phase of light transmitting through the optical waveguide by applying a voltage to the electrode. Hereinafter, the first optical waveguide 4 provided with the electrode and the second optical waveguide 5 provided with the electrode will be referred to as a first phase modulator 17 and a second phase modulator 27, respectively.

Lights outputted from the first optical waveguide 4 and the second optical waveguide 5 are inputted to the optical coupler 8, and from the optical coupler 8, lights are each outputted to a corresponding one of the first optical output port 30 and the second optical output port 31.

The LN modulator 300 applies voltages to the first phase modulator 17 and the second phase modulator 27, and thereby varies the phases of lights transmitting through the waveguides. Further, it is possible to vary the intensities of lights outputted from the first light output port 30 and the second light output port 31 by utilizing a light interference effect in the optical coupler 8.

Meanwhile, an optical modulation function similar to that of the LN modulator 300 shown in FIG. 12 can be also realized by using optical waveguides composed of a semiconductor material. Currently, for realizing such an optical modulator, an indium phosphide (InP) and arsenic indium phosphide gallium (InGaAsP)-origin material and an gallium arsenide (GaAs) and aluminum gallium arsenide (AlGaAs)-origin material are proposed. Then, there has been proposed an optical modulator including a Mach-Zehnder interferometer composed of one of these semiconductor materials. With respect to such an optical modulator using the semiconductor material, generally, it is possible to lower an operation voltage for the optical modulator to a fraction of the operation voltage of the LN modulator, and further reduce the size of the optical modulator to less than or equal to one tenth as compared with that of the LN modulator. This is because a variation coefficient of a refractive index relative to the voltage with respect to a semiconductor material is larger than or equal to several ten times that of lithium niobate.

Some of optical modulators constituted by optical waveguides have a function of, for the purpose of setting an optimum operational condition, monitoring lights transmitting through the optical waveguides and feeding back the monitoring result to driving conditions for the optical modulator. In patent literature (PTL) 1 to 3, there is disclosed a configuration in which part of a light signal is monitored by using a photodiode (PD) provided at outside. Through such a configuration, characteristic deterioration during operation of the optical modulator is suppressed.

Further, in PTL4, there is disclosed a configuration of an optical FSK/SSB modulator which is capable of adjusting the intensity of a light signal outputted from a sub-Mach-Zehnder waveguide. Further, in PTL5, there is disclosed a configuration of an optical modulator provided with a Mach-Zehnder waveguide for an intensity adjustment.

Generally, the PD for monitoring light transmitting through an optical waveguide is provided at outside of the optical modulator, or, as described in PTL3, the PD is monolithic-integrated at inside of the optical modulator. Even when the PD is integrated, a signal outputted as the result of operation of a Mach-Zehnder interferometer (the signal being a signal at a portion outer than the optical coupler of the optical modulator) needs to be monitored.

Further, in the LN modulator 300 shown in FIG. 12, the configuration that lights radiated from the edges of the waveguides are monitored in order to detect the intensities of lights having transmitted through the first optical waveguide 4 and the second optical waveguide 5, it is impossible to directly grasp the light intensities inside of the optical waveguides. For this reason, with respect to the LN modulator 300 shown in FIG. 12, there has been also a problem that it is difficult to grasp the situation of light transmitting inside thereof with accuracy.

For example, in an optical modulator disclosed in PTL3, a PD for detecting the light intensity is monolithically-integrated inside the optical modulator. Nevertheless, even in the configuration disclosed in PTL3, the light intensity is monitored at a portion outer than the optical coupler. For this reason, in the configuration disclosed in PTL3, there is a problem that it is difficult to grasp the intensity of light inputted to the optical coupler with accuracy.

CITATION LIST

Patent Literature

[PTL1] Japanese Patent Publication No. 3974792
[PTL2] Japanese Unexamined Patent Application Publication No. 1998-228006
[PTL3] Japanese Unexamined Patent Application Publication No. 2001-209018
[PTL4] Japanese Unexamined Patent Application Publication No. 2007-057782
[PTL5] Japanese Unexamined Patent Application Publication No. 2010-072462

SUMMARY OF INVENTION

Technical Problem

In the LN modulator 300 shown in FIG. 12, the minimum value of the intensity of light outputted from the first optical output port 30 or the second optical output port 31 is completely zero, provided that lights inputted to the optical coupler 8 from the two optical waveguides 4 and 5 are coupled under the state where the ratio of the intensities of the lights is exactly equal. That is, in this case, an extinction ratio (an on/off ratio of a light signal) of the lights has an infinite value.

Actually, however, sometimes, the extinction ratio of the light outputted from the optical waveguide does not have the infinite value but has a finite value. Reasons for this will be described below.

A first reason is that, sometimes, a division ratio regarding the light intensities of lights outputted from the optical division circuit 3 is not strictly equal because of a manufacturing error and wavelength dependency with respect to the optical waveguide.

A second reason is that bias voltages applied to the first optical waveguide 4 and the optical waveguide 5 are different from each other when phase modulation is performed, so that optical waveguide losses of the first optical waveguide 4 and the second optical waveguide 5 are also different from each other. That is, in general, when phase modulation is performed, bias voltages each applied to the first phase modulator 17 and the second phase modulator 27 are different from each other. Thus, a difference arises between the losses caused by the first optical waveguide 4 and the second optical waveguide 5. Incidentally, because of a variation over time regarding the characteristics of each of the optical waveguides, sometimes, the losses caused by the first optical waveguide 4 and the second optical waveguide 5 gradually become different from each other.

Moreover, in addition to the first and second reasons described above, there is given a third reason that, because of a manufacturing error between the first and second optical waveguides, misalignment arises in the ratio of the light intensity of light having transmitted through the first optical waveguide 4 and the light intensity of light having transmitted through the second optical waveguide 5.

Because of the asymmetric properties regarding the inputs to the optical coupler 8 in the first to third reasons described above, the extinction ratios of lights outputted from the first optical output port 30 and the second optical output port 31 are likely to degrade.

The degradation of the optical extinction ratio leads to deterioration of the transmission characteristics of light. Thus, it is desirable that, during operation of the optical modulator, the extinction ratio of each of lights outputted from the optical coupler 8 can be improved by monitoring lights each transmitting through the optical waveguides and feeding back monitored situations of the lights to a driving circuit for the phase modulators.

It is possible to adjust a loss difference between the loss caused by the first optical waveguide 4 and the loss caused by the second optical waveguide 5 by adjusting voltages applied to the electrodes provided on the optical waveguides. Nevertheless, even if a desired loss difference has been realized, simultaneously, a not intended phase difference arises between the lights transmitting through the both optical waveguides because of the characteristics of a semiconductor material. As a result, for a general optical modulator, there has been a problem that the adjustment of the bias voltages results in a degradation of the modulation characteristics of the Mach-Zehnder type optical modulator.

Further, in PTL5, there is disclosed a configuration in which, besides the Mach-Zehnder interferometer for modulation, another Mach-Zehnder interferometer for a light intensity adjustment is provided and lights divided at the stage anterior to the optical coupler are monitored. In the configuration disclosed in PTL5, the light intensities are adjusted by causing a PD to monitor each of the divided lights and performing feedback control. Nevertheless, in an optical modulator composed of a semiconductor material, applying a voltage to an electrode provided on the optical waveguide causes simultaneous variations of the phase and the loss of light. Accordingly, it is difficult to adjust only the loss merely by employing such a Mach-Zehnder interferometer for a light intensity modulation as described in PTL5. In addition, since the optical modulator described in PTL5 includes the Mach-Zehnder interferometer for a light intensity modulation, there is also a problem that configuration of the optical modulator is complicated.

Meanwhile, in each of the technologies described in PTL1 to PTL4, there is not disclosed a configuration which makes it possible to, in a simple and easy configuration, independently perform control of a phase difference and losses of lights each transmitting through a corresponding one of the two optical waveguides each composed of a semiconductor material.

OBJECT OF INVENTION

An object of the present invention is to provide a technology which makes it possible to, in a simple and easy configuration, independently perform control of a phase difference and losses of lights transmitting through an optical waveguide device including a first optical waveguide and a second optical waveguide.

Solution to Problem

An optical waveguide device according to the present invention includes an optical waveguide provided with two electrodes each supplied with a corresponding one of two signals; and a control means for controlling the two signals so as to cause a phase variation and a loss variation which are caused in light transmitting through the optical waveguide by the two signals to each have a predetermined value.

A control method for an optical waveguide device of the present invention performs control so as to cause two signals each applied to a corresponding one of two electrodes included in an optical waveguide to give a predetermined phase variation and a predetermined loss variation to light transmitting through the optical waveguide.

Advantageous Effects of Invention

According to some aspects of the present invention, it becomes possible to independently perform control of a phase difference and losses which are given to any two ones of lights each transmitting through a corresponding one of a plurality of optical waveguide devices, in a simple and easy configuration.

DESCRIPTION OF EMBODIMENTS

Hereinafter, exemplary embodiments of the present invention will be described with reference with the drawings. In addition, in all of the drawings, any common component is denoted by the same reference sign, and description of the component is omitted according to circumstances.

First Exemplary Embodiment

In this first exemplary embodiment, there is proposed a configuration of an optical waveguide device which, between the first optical waveguide and the second optical waveguide included in the Mach-Zehnder type optical modulator composed of a semiconductor material, gives a desired phase difference to the lights, and simultaneously, causes light densities of the lights to be equally balanced.

In this first exemplary embodiment, the light intensities of lights each transmitting through the waveguides are monitored at positions anterior to the optical coupler in a modulated light traveling direction, and voltages applied to an electrode of the first optical waveguide and an electrode of the second optical waveguide are controlled on the basis of the monitored light intensities. A specific example of a configuration therefor is shown in FIG. 1.

Figure 1:
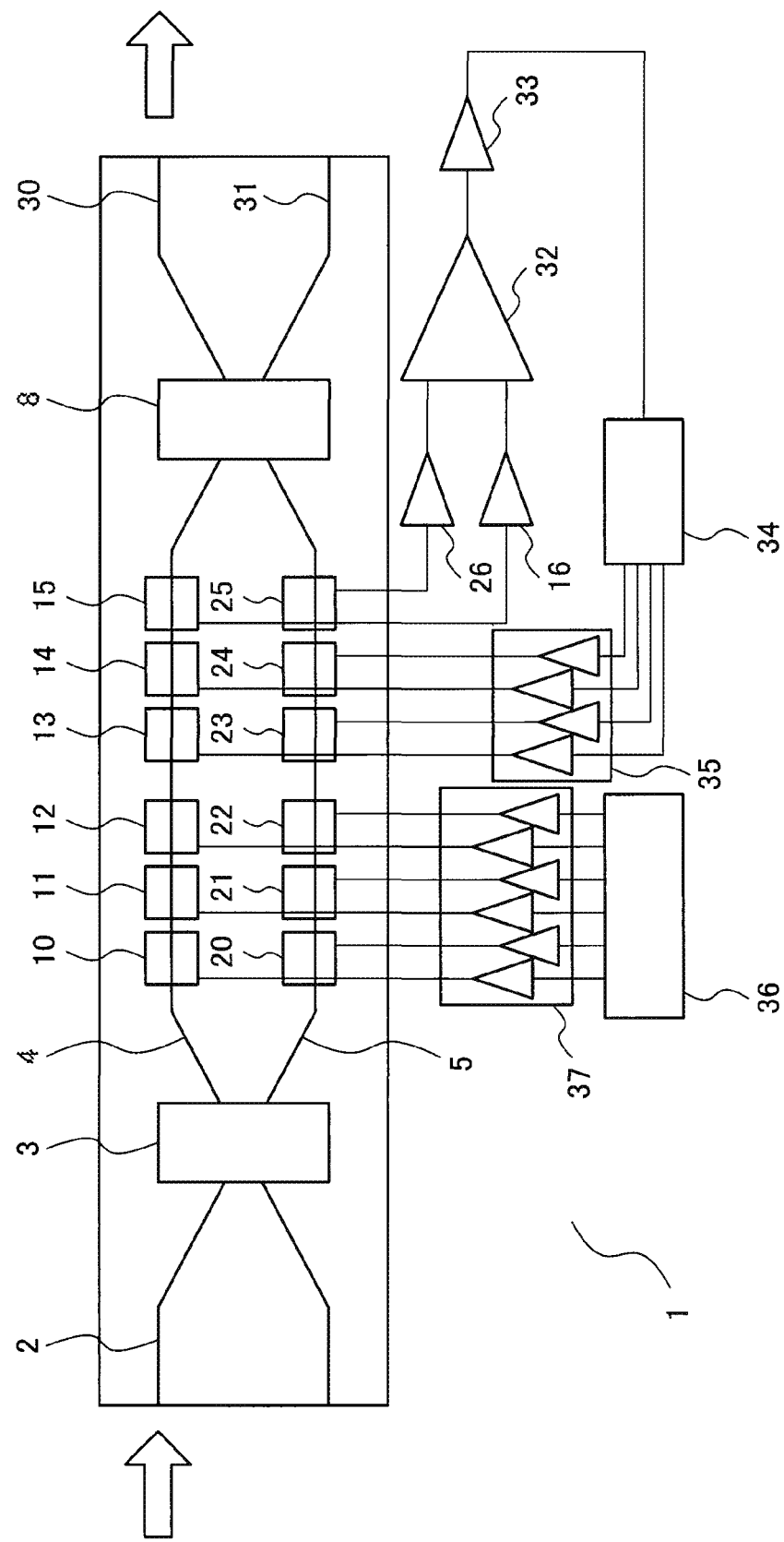
FIG. 1 A block diagram illustrating a configuration of an optical waveguide device of a first exemplary embodiment FIG. 2 A diagram illustrating an example of a refractive index variation when a voltage is applied to a semiconductor optical modulator FIG. 3 A diagram illustrating an example of a loss variation when a voltage is applied to a semiconductor optical modulator FIG. 4 A location diagram illustrating of control electrodes in a first exemplary embodiment FIG. 5 A diagram illustrating isopleths on each of which a sum of $\Delta n$ is constant in a first exemplary embodiment FIG. 6 A diagram illustrating isopleths on each of which a sum of $\Delta \alpha$ is constant in a first exemplary embodiment FIG. 7 A diagram obtained by superimposing FIG. 5 and FIG. 6 on each other FIG. 8 A diagram illustrating the shape of an electrode of an optical waveguide device of a second exemplary embodiment FIG. 9 A diagram illustrating the shape of an electrode of an optical waveguide device of a second exemplary embodiment FIG. 10 A diagram illustrating a configuration of an optical waveguide device of a third exemplary embodiment FIG. 11 A diagram illustrating a configuration of an optical waveguide device of a fourth exemplary embodiment FIG. 12 A diagram illustrating a configuration of a general Mach-Zehnder type optical modulator

FIG. 1 is a diagram illustrating a configuration of an optical waveguide device of the first exemplary embodiment of the present invention. An optical waveguide device of this first exemplary embodiment makes up an optical modulator 1 including a Mach-Zehnder interferometer (MZI) as a basic component. In FIG. 1, light inputted from an optical input port 2 transmits through an optical divider 3. The optical divider 3 divides the intensity of the inputted light so as to make a ratio of the intensity of first divided light and the intensity of second divided light equal to approximately one to one, and then, outputs the first divided light and the second divided light to a first optical waveguide 4 and a second optical waveguide 5, respectively.

Here, for example, a 2×2 multi-mode interference (MMI) directional coupler may be employed as the optical divider 3. In the case where the MMI directional coupler is employed as the optical divider 3, light outputted to the first optical waveguide 4 and light outputted to the second optical waveguide 5 are mutually different in phase by 90 degrees. Meanwhile, in the case where the optical divider 3 is, for example, a Y-shaped division circuit, light outputted to the first optical waveguide 4 and light outputted to the second optical waveguide 5 have the same phase. In the first exemplary embodiment, the configuration of the optical divider 3 is not limited to a specific one.

Electrodes 10 to 15 and Electrodes 20 to 25 are added to the first optical waveguide 4 and the second optical waveguide 5, respectively. Among these electrodes, the electrodes 10 to 12 and the electrodes 20 to 22 are used for optical modulation. Through applying voltages to these electrodes, it is possible to vary refractive indexes of the optical waveguides on which these electrodes are formed. Moreover, through the variations of the refractive indexes of the optical waveguides, it is possible to vary the phases of lights transmitting through the optical waveguides.

Both of the light having transmitted through the first optical waveguide 4 and light having transmitted through the second optical waveguide 5 are inputted to an optical coupler 8. Further, light outputted from the optical coupler 8 is outputted to a first optical output port 30 and a second optical output port 31. At this time, a light intensity ratio regarding the light outputted to the first optical output port 30 and the light outputted to the second optical output port 31 is determined in accordance with a phase difference between the lights inputted to the optical coupler 8 from the first optical waveguide 4 and the second optical waveguide 5.

For example, in the case where each of the optical divider 3 and the optical coupler 8 is the MMI directional coupler, as described above, the lights are given a phase difference of 90 degrees for each of the optical divider 3 and the optical coupler 8. Thus, in the case where the intensities of lights inputted to the optical coupler 8 from of the first optical waveguide 4 and the second optical waveguide 5 are equal to each other, and further, a phase difference caused by the optical waveguide 4 and the optical waveguide 5 is 0 degrees, the entire light is outputted to the optical waveguide 31. This is because, whichever of the optical waveguide 4 and the optical waveguide 5 light transmits through, its path length from the optical input port 2 to the optical output port 31, including a length equivalent to the phase difference, becomes constant. Further, in the above-described configuration, in the case where the intensities of lights inputted to the optical coupler 8 from the first optical waveguide 4 and the second optical waveguide 5 are equal to each other, and a phase difference caused by the optical waveguide 4 and the optical waveguide 5 is 90 degrees, the first optical output port 30 and the second optical output port 31 output lights whose light intensity ratio is one to one. Further, in the case where the intensities of lights from the first optical waveguide 4 and the second optical waveguide 5 are equal to each other, and further, a phase difference caused by the optical waveguide 4 and the optical waveguide 5 is 180 degrees, the entire light is outputted to the first optical output port 30.

That is, in the case where the intensities of the lights inputted to the optical coupler 8 are equal, through control of a phase difference between the lights inputted to the optical coupler 8, it is possible to vary the light intensities of lights divided to the first optical output port 30 and the second optical output port 31.

Nevertheless, as described above, it is difficult to perform setting of light intensities so that the intensities of the lights inputted to the optical coupler 8 are precisely equal to each other.

Thus, in this first exemplary embodiment, as shown in FIG. 1, the optical modulator 1 is provided with the plurality of divided electrodes, that is, the electrodes 10 to 15 and the electrodes 20 to 25. Then, some of the divided electrodes are used for control of the characteristics of each of the first optical waveguide 4 and the second optical waveguide 5.

In the first exemplary embodiment, in order to monitor the light intensities of lights inputted to the optical coupler 8 from the first optical waveguide 4 and the second optical waveguide 5, the electrode 15 and the electrode 25 are each used as a monitoring electrode.

When each of the electrode 15 and the electrode 25 is supplied with a reverse bias voltage, each of the electrode 15 and the electrode 25 absorbs light transmitting through neighboring portion of the electrode of the optical waveguide, and generates a light absorption electric current. The magnitude of the light absorption electric current depends on the light intensity of the light transmitting through the optical waveguide, and thus, it is possible to monitor the light intensity of the light transmitting through inside the optical waveguide on the basis of the magnitude of the light absorption electric current. Hereinafter, an electrode for generating a light absorption electric current will be referred to as a "monitor electrode".

Incidentally, the electrodes 13, 14, 23 and 24 which apply voltages to the first optical waveguide 4 and the second optical waveguide 5 on the basis of a result of a below-described signal processing performed by a digital signal processor (DSP) 34 will be each referred to as "control electrode", hereinafter.

Here, each of the electrodes 10 to 12 and 20 to 22 which are actually used for modulation of lights may basically include the same structure as that of each of the electrodes 13 to 15 and 23 to 25 which are used for optical-waveguide characteristics. For example, when manufacturing an optical modulator, a difference in structure between an electrode for use in modulation and an electrode for use in control of optical-waveguide characteristics may be, at most, a wiring pattern of an electrode. The manufacturing of the optical modulator 1 is made easy by causing the electrode for modulation and the electrode for control of characteristics to have structures similar to each other.

Transimpedance amplifiers (hereinafter, each referred to as TIA) 16 and 26 are electrically connected to the electrodes 15 and 25 which are monitor electrodes respectively. The TIA amplifies a light absorption electric current, converts the amplified electric current into a voltage signal and outputs the voltage signal to a differential amplifier 32. This differential amplifier 32 generates a voltage signal corresponding to a difference between a voltage outputted by the TIA 16 and a voltage outputted by the TIA 26, and outputs the voltage signal to an A/D converter 33. This A/D converter 33 performs an A/D conversion of the voltage signal outputted from the differential amplifier 32, and outputs a resultant digital voltage signal to a DSP 34.

The TIA 16, the TIA 26, the differential amplifier 32 and the A/D converter 33 are sufficient, provided that they are capable of performing processing regarding temporal average values of the light intensities of lights transmitting through the optical waveguides. Accordingly, with respect to each of the TIA 16, the TIA 26, the differential amplifier 32 and the A/D converter 33, high-speed operation whose speed is equal to or near a signal speed is not required. This is because an optical modulator operates in a relatively stable state in the short term, provided that appropriate conditions are set thereto during an initial training, and thus, the characteristic control of optical waveguides should be performed on a long-term variation of an operating environment.

A signal outputted by the A/D converter 33 is inputted to the DSP 34 and the signal is subjected to signal processing. The DSP 34 determines the values of voltages to be applied to the electrodes 13, 14, 23 and 24 which are control electrodes so that the intensities of lights inputted to the optical coupler 8 from the first optical waveguide 4 and the second optical waveguide 5 is equal to each other.

Figure 2:
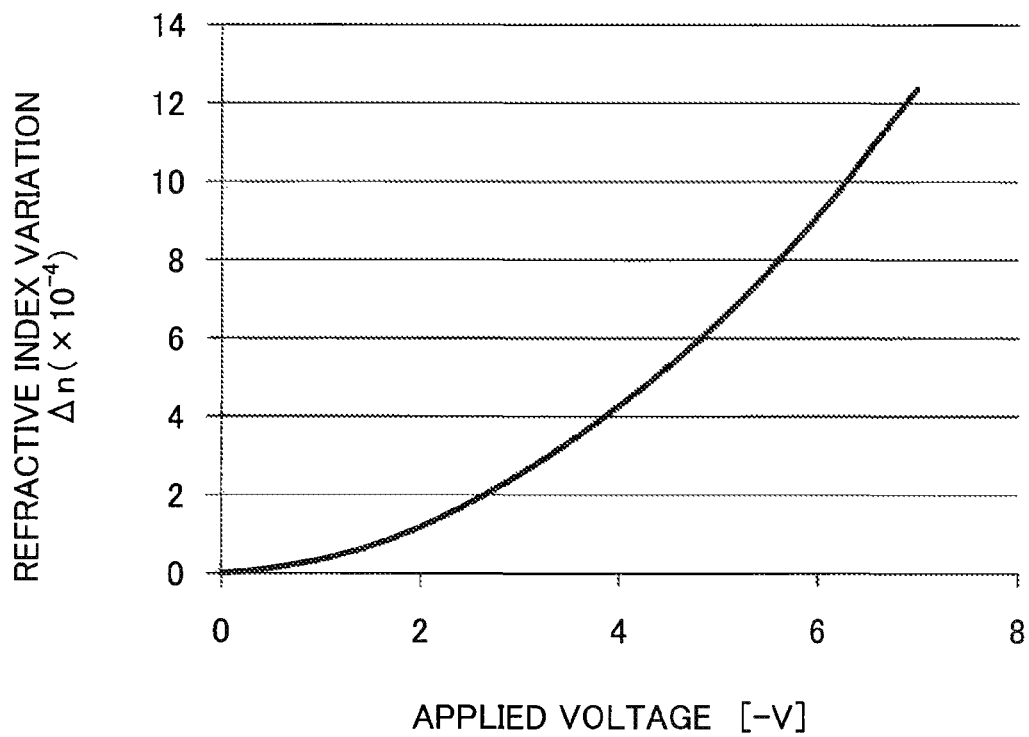
Figure 3:
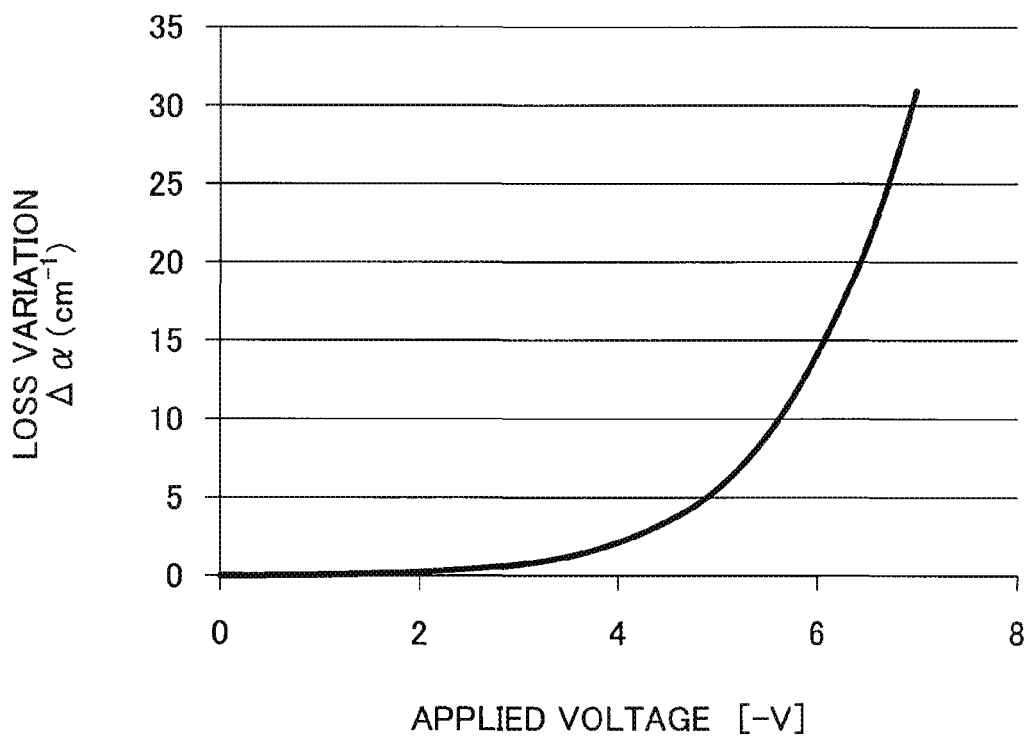

FIG. 2 and FIG. 3 illustrate an example of a refractive index variation and an example of a loss variation, respectively, when a voltage is applied to a semiconductor optical modulator. As shown in FIG. 2 and FIG. 3, the refractive index variation and the loss variation each increase as the reverse bias voltage applied to the semiconductor optical modulator becomes high. Here, the refractive index variation and the loss variation each are not linear relative to the variation of the applied voltage. Moreover, a ratio of the refractive index variation and the loss variation is not linear relative to the applied voltage, either.

The optical modulator 1 of the first exemplary embodiment controls a refractive index variation and a loss variation of the optical waveguides independently by applying mutually different voltages to the plurality of electrodes. An example of a procedure for controlling voltages to be applied to the electrodes will be described below.

As shown in FIG. 2, the refractive index variation is denoted by $\Delta n$ (V), and as shown in FIG. 3, the loss variation is denoted by $\Delta \alpha$ (V). Here, (V) means that a variation, such as $\Delta n$ or $\Delta \alpha$, is a function of an applied voltage V to the electrodes. While light is subjected to a refractive index variation $\Delta n$ (V) and a loss variation $\Delta \alpha$ (V) while transmitting through an optical waveguide of a length of L, a complex phase variation amount Δφ (V) of the light is represented by the following formula:

$$\Delta\phi(V) = (4 \times \pi \times \Delta n(V)/\lambda - j \times \Delta\alpha(V)/2) \times L \quad (1)$$

In formula (1), the real part indicates a phase variation and the imaginary part indicates a loss variation. λ is a wavelength of the light. When actual calculation is performed using formula (1), with respect to λ and L each having a dimension of a length, as well as Δα (V) having a dimension of the reciprocal of a length, a unit conversion is performed as needed so that Δφ (V) can be represented in a unit of radian which is dimensionless.

Figure 4:
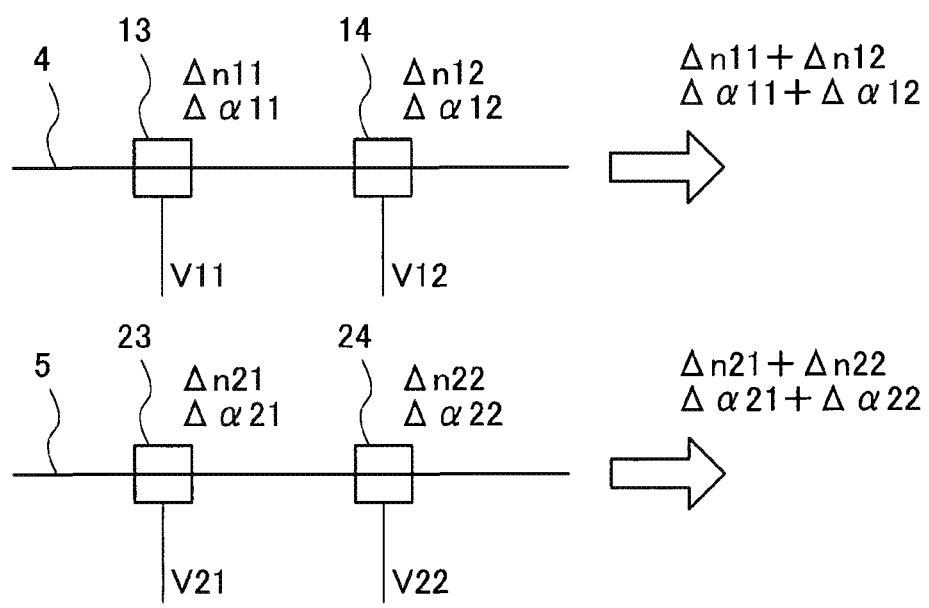

FIG. 4 is a location diagram of the control electrodes in this first exemplary embodiment. As shown in FIG. 4, the electrode 13 and the electrode 14 are made control electrodes for the first optical waveguide 4; the electrode 23 and the electrode 23 are made control electrodes for the second optical waveguide 5; and control voltages applied to the electrode 13, the electrode 14, the electrode 23 and the electrode 24 are made, in order of the above electrodes, V11, V12, V21 and V22. Further, a refractive index variation Δn and a loss variation Δα to which the first optical waveguide 4 is subjected by being supplied with voltages to be applied to the electrodes 13, 14, 23 and 24 are made, in order of the above electrodes, "Δn 11 and Δα 11", "Δn 12 and Δα 12", "Δn 21 and Δα 21" and "Δn 22 and Δα 22".

Figure 5:
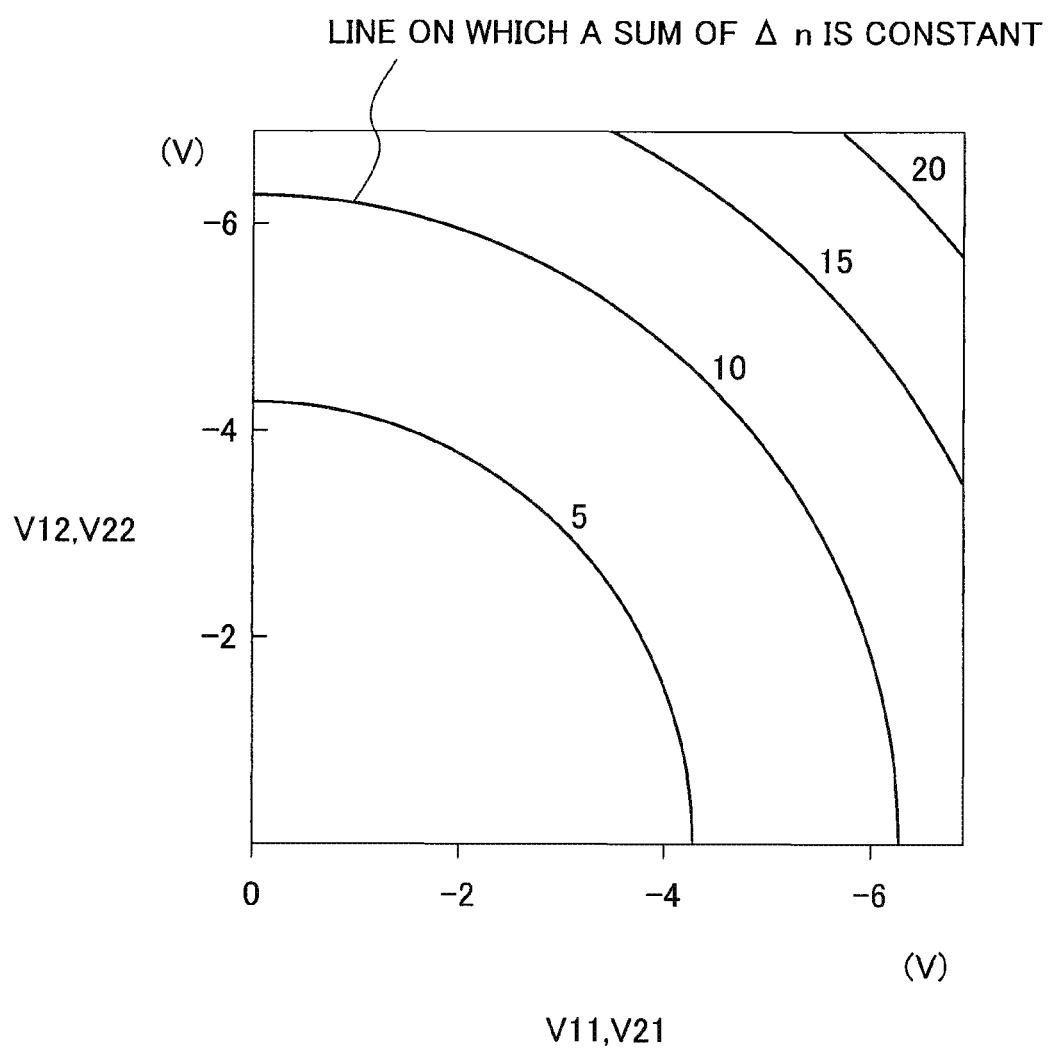

In FIG. 5, voltages applied to two serially connected electrodes provided on an optical waveguides are each associated with a corresponding voltage of a horizontal axis and a vertical axis, and isopleths on each of which a sum of Δn (sum of phase variation amounts) caused by the two electrodes is constant, are indicated. For example, since the electrode 13 and the electrode 14 are connected in series, isopleths shown in FIG. 5 indicate, with respect to the entire first optical waveguide 4, loci each resulting from tracing points each corresponding to V11 and V12 which make (Δn 11+Δn 12) constant. Further, since the electrode 23 and the electrode 24 are also connected in series, isopleths shown in FIG. 5 indicate, with respect to the entire second optical waveguide 5, loci each resulting from tracing points each corresponding to V 21 and V 22 which make (Δn 21+Δn 22) constant.

That is, FIG. 5 indicates that it is possible to perform control so as to cause a sum of Δn (a sum of phase variation amounts) regarding light transmitting through the optical waveguides not to vary by increasing a voltage applied to one of the electrodes and decreasing a voltage applied to the other one of the electrodes along the isopleth. Through utilization of this relation, it is possible to perform control of the intensities of the lights transmitting through the first optical waveguide 4 and the second optical waveguide 5 by giving loss variations to the lights while keeping a phase difference between the lights constant.

Figure 6:
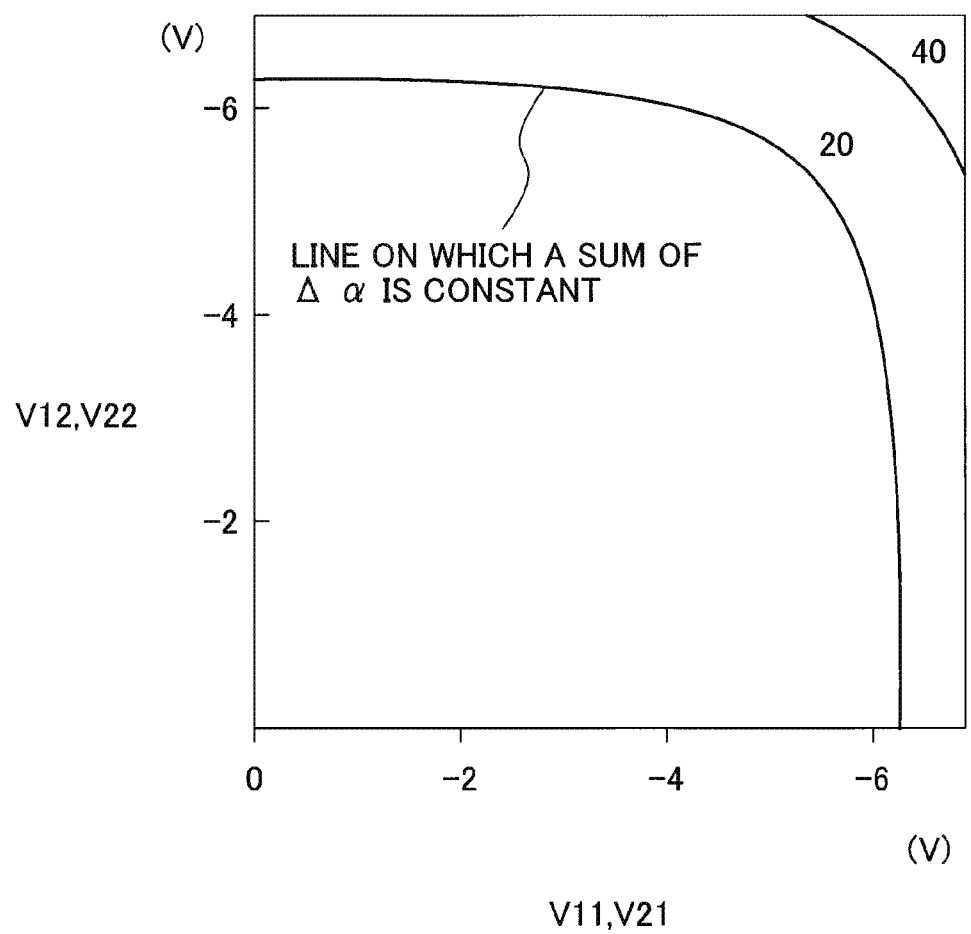

In FIG. 6, voltages applied to two serially connected electrodes provided on the optical waveguides are each associated with a corresponding voltage of a horizontal axis and a vertical axis, and isopleths on each of which a sum of Δα (a sum of loss variation amounts) caused by the two electrodes is constant, are indicated. For example, since the electrode 13 and the electrode 14 are connected in series, (Δα 11+Δα 12) becomes constant on each of isopleths of FIG. 6. Further, since the electrode 23 and the electrode 24 are also connected in series, the isopleths of FIG. 6 are also isopleths on each of which (Δα 21+Δα 22) becomes constant.

That is, FIG. 6 indicates that it is possible to perform control of the phases of lights each transmitting through t the optical waveguide so as to cause losses of the first optical waveguide 4 and the second optical waveguide 5 not to vary by increasing a voltage applied to one of the electrodes and decreasing a voltage applied to the other one of the electrodes along the isopleth.

Figure 7:
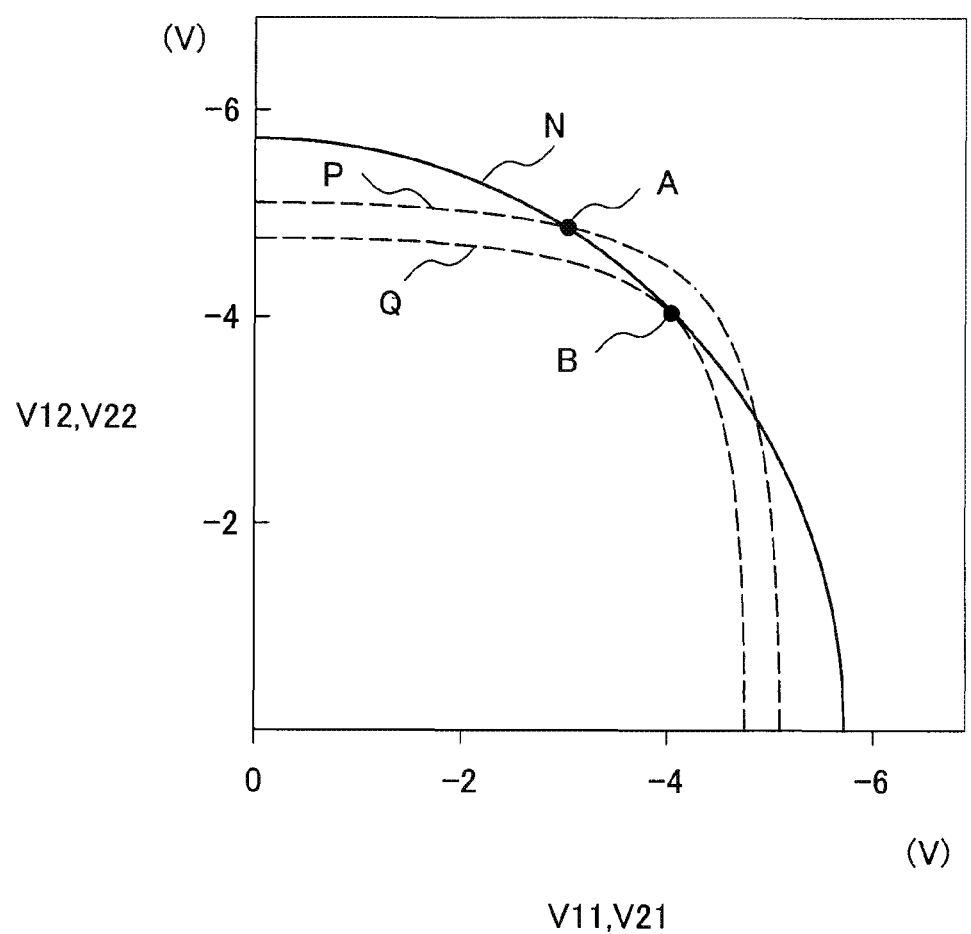

FIG. 7 is a diagram obtained by superimposing FIG. 5 and FIG. 6 on each other. In FIG. 7, a solid line N indicates an isopleth on which a sum of Δn is constant, and a dashed line indicates an isopleth on which a sum of Δα is constant. In FIG. 7, when varying voltages applied to control electrodes along the solid line N, the locus by varied voltages moves across dashed lines P and Q on each of which a sum of Δα is constant. That is, on the solid line N shown in FIG. 7, a loss varies while a phase is kept constant.

A reason why such control can be performed is that Δn (a phase variation amount) and Δα (a loss variation amount) relative to a variation of a voltage applied to an electrode are different from each other.

Points A and B shown in FIG. 7 indicate an example of setting values of the voltages V11, V12, V21 and V22 in the case where a loss difference between the first optical waveguide 4 and the second optical waveguide 5 is set to 1 cm$^{-1}$ under the state where a phase difference between the lights is kept constant. The point A indicates setting voltages of the voltages V11 and V12, and the point B indicates setting voltages of the voltages V21 and V22.

Specifically, when giving a loss difference of 1 cm$^{-1}$ to the first optical waveguide 4 and the second optical waveguide 5, the voltages V11, V12, V21 and V22 should be set so that the positions of the points A and B on the solid line N can be onto the dashed lines P and Q between which a difference in a sum of Δα is 1 cm$^{-1}$.

In FIG. 7, the voltage values of the points A and B are as follows.

V11=3.6 V and V12=4.6 V (point A)
V21=4.0 V and V22=4.0 V (point B)

Here, the value of a sum of Δn is twice of the value of Δn at V21=4 V in FIG. 2, that is, approximately $8 \times 10^{-4}$. This value is constant on the solid line N. Nevertheless, the sum of Δn is not limited to this value. Voltages corresponding to intersections of the solid line N and different dashed lines P and Q between which a difference in a sum of Δα is 1 cm$^{-1}$ may be set as the voltages V11, V12, V21 and V22. In this case, it is also possible to set a loss difference between the first optical waveguides 4 and the second optical waveguides under the state where a phase difference which is different from the case of FIG. 7.

The DSP 34 stores therein data corresponding to data on the isopleth lines shown in FIG. 7. Further, in such a way as described above, the DSP 34 determines the voltages V11, V12, V21 and V22 to be applied to the control electrodes so that a predetermined loss difference can arise between the first optical waveguide 4 and the second optical waveguide 5 under the state where a phase difference between the lights is kept constant. In this case, the DSP 34 obtains voltages to be applied to the control electrodes by performing an arithmetic operation on the basis a difference between light absorption electric currents arising at the electrode 15 and the electrode 25 so that the ratio of the intensities of lights inputted to the optical coupler 8 from the first optical waveguide 4 and the second optical waveguide 5 becomes a desired ratio (for example, the same ratio). That is, the DSP 34 performs control of losses given to the first optical waveguide 4 and the second optical waveguide 5 under the state where a difference between phase variations given to the first optical waveguide 4 and the second optical waveguide 5t is kept constant. In addition, a driver 35 for amplifying an applied voltage may be provided between the DSP 34 and each of the electrodes.

Further, a loss of a portion of the first optical waveguide 4 where the electrodes 10 to 12 are provided as well as a portion of the second optical waveguide 5 where the electrodes 20 to 22 are provided is likely to increase because of a long-term use of these electrodes in optical modulation. Further, when increase in the loss regarding the first optical waveguide 4 and increase in the loss regarding the second optical waveguide 5 is different from each other, the intensities of the lights inputted to the optical coupler 8 from the first optical waveguide 4 and the second optical waveguide 5 fluctuate. In such a case, on the basis of a difference between the light absorption electric currents arising at the electrode 15 and the electrode 25, the DSP 34 may also calculate the voltages V11, V12, V21 and V22 which cause the intensities of the lights inputted to the optical coupler 8 to be equal to desired values, and may apply the calculated voltages to the control electrodes. As a result, even when the loss of the first optical waveguide 4 or the loss of the second optical waveguide 5 varies with time, the optical modulator 1 of this first exemplary embodiment can perform control so that a ratio of the intensities of the lights inputted to the optical coupler 8 can be a predetermined ratio. In addition, when a division ratio of the optical divider 3 varies with time, and thereby the intensities of the lights inputted to the optical coupler 8 from the first optical waveguide 4 and the second optical waveguide 5 vary, similarly, it is possible to perform control so that a ratio of the intensities of the lights inputted to the optical coupler 8 can be a predetermined ratio.

As described above, the optical modulator 1 of the first exemplary embodiment monitors the intensities of lights each transmitting through the first optical waveguide 4 and the second optical waveguide 5, and performs control of voltages to be applied to the electrodes 13, 14, 23 and 24 so that a ratio of the light intensities can be a desired value. For example, when the TIA 16 and the TIA 26 output voltages equal to each other with respect to lights having intensities equal to each other, the DSP 34 calculates and outputs voltages to be applied to the control electrodes along an isopleth on which a sum of Δn is constant, so as to make a voltage outputted from the differential amplifier 32 equal to zero. As a result, in the optical modulator 1 of the first exemplary embodiment, the intensities of lights each transmitting through the first optical waveguide and the second optical waveguide can be made equal to each other without involving the phase variations between the lights.

Here, when an optical absorptivity of the electrode 15 and that of the electrode 25 are different from each other, as a result, amounts of light absorption electric currents with respect to the light intensities inside the optical waveguides are different from each other depending on the electrodes. This may cause an error in the characteristic control of the optical waveguides. For this reason, the amounts of light absorption electric currents relative to the light intensities inside the optical waveguides may be measured, and may be given to the DSP 34 as correction data in advance. Further, during the arithmetic processing performed by the DSP 34, it is possible to perform control of the light intensities inside the optical waveguides with more accuracy by correcting the fluctuation of the optical absorptivity between the electrodes on the basis of the correction data.

Further, in the first exemplary embodiment, an example in which a sum of Δα (a loss variation amount) is controlled while keeping a sum of Δn (a phase variation amount) constant has been described. Moreover, conversely, it is possible to perform control of a sum of Δn (a phase variation amount) while keeping a sum of Δα (a loss variation amount) constant. An exemplary embodiment thereof will be described in a third exemplary embodiment.

Hereinbefore, the characteristic control of the optical waveguides in the optical modulator 1 of the first exemplary embodiment has been described. An optical modulation procedure for the electrodes 10 to 12 and 20 to 22 for optical modulation is well known, and thus, detailed description thereof is omitted here. As described above, each of the electrodes 10 to 12 and the electrodes 20 to 22 basically includes the same structure as that of each of the electrodes 13 to 15 and the electrodes 23 to 25. Further, a control circuit for generating voltages to be applied to the electrodes 10 to 12 and the electrodes 20 to 22 is integrated as a modulation circuit 36 and a driver 37. Through such a configuration described above, the optical modulator 1 of this first exemplary embodiment enables realization of a compact optical modulation circuit including an optical modulator and a control circuit.

Further, in this exemplary embodiment, it is possible to realize the optical waveguide by employing, besides a general compound semiconductor, a material whose absorption and refractive index varies, such as silicon or germanium.

As described above, the optical waveguide device of the first exemplary embodiment makes it possible to give a desired phase difference to lights each transmitting through optical waveguides included in the Mach-Zehnder type optical modulator composed of a semiconductor material, and simultaneously therewith, equally balance the intensities of the lights inputted to the optical coupler. As a result, the optical waveguide device of the first exemplary embodiment makes it possible to improve the extinction ratios of lights outputted by the optical modulator.

That is, the optical waveguide device of the first exemplary embodiment makes it possible to, in a simple and easy configuration, independently perform control of phase difference and losses which are given to lights each transmitting through a plurality of optical waveguides.

Incidentally, in the first exemplary embodiment, the monitoring electrode 15 is arranged between the electrode 14 and the optical coupler 8. However, the position of a monitoring electrode is sufficient, provided that the monitoring electrode is positioned on an optical waveguide including the electrode 14 and the optical coupler 8. In order to monitor the light intensity of light inputted to the optical coupler 8 with further accuracy, it is desirable to provide the electrode 15 at a position near the optical coupler 8. Nevertheless, it is also possible to use an electrode at a different position as a monitoring electrode by making a correction of a waveguide loss between the monitoring electrode 15 and the optical coupler 8, and then calculating voltages to be applied to the electrodes. The position of the electrode 25 is discussed in a similar way to the electrode 15.

Further, in FIG. 2, FIG. 3 and FIGS. 5 to 7, a case where the characteristics of the first optical waveguide 4 are the same as those of the second optical waveguide 5 has been described. In the case where the characteristics of the first optical waveguide 4 are different from those of the second optical waveguide 5, the DSP 34 may store characteristic data for both of the first optical waveguide 4 and the second optical waveguide 5 and may calculate the voltages V11, V12, V21 and V22 on the basis of the characteristic data for both of the first optical waveguide 4 and the second optical waveguide 5.

Further, the positions of the electrodes supplied with voltages from the DSP 34 may be freely set, provided that relations between the supplied voltages and the intensities of the lights inputted to the optical coupler 8 can be grasped.

Further, in this exemplary embodiment, although the electrodes for optical modulation are made the electrodes 10 to 12 and the electrodes 20 to 22, the number of the electrodes used for optical modulation is not limited to this.

Moreover, in this first exemplary embodiment, although an example in which the optical waveguide device is applied to the Mach-Zehnder type optical modulator has been given, an application configuration of the optical modulator having been described in the first exemplary embodiment is not limited to this. In general, the configuration of the optical waveguide device of this first exemplary embodiment can be applied to an optical waveguide device expected to independently perform control of a phase variation and a loss variation with respect to between two semiconductor optical waveguides.

Second Exemplary Embodiment

Next, a second exemplary embodiment of the present invention will be described. An optical waveguide device of the second exemplary embodiment is an optical waveguide device resulting from changing the shapes of the control electrodes provided on the optical waveguides 4 and 5 in the optical waveguide device, shown in FIG. 1, according to the first exemplary embodiment.

Figure 8:
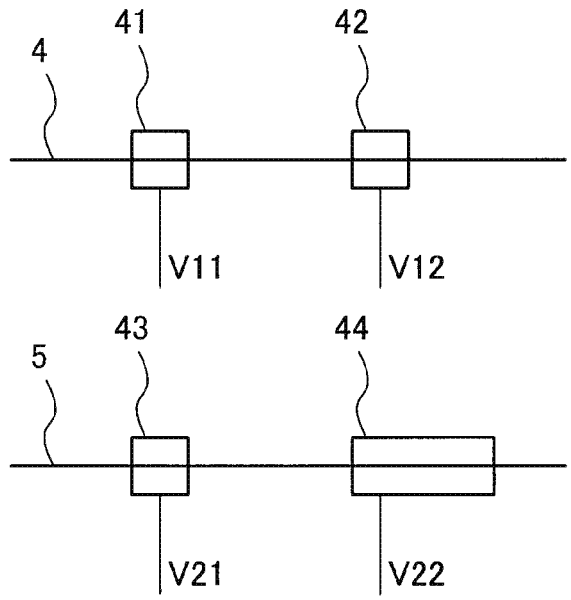
Figure 9:
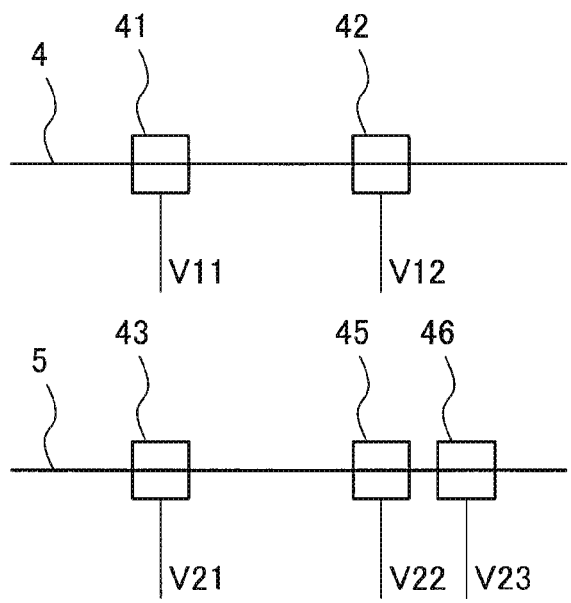

In FIG. 8 and FIG. 9, there are illustrated the shapes of the electrodes of the optical waveguide device of the second exemplary embodiment. In FIGS. 8 and 9, there are illustrated only electrodes 41 to 46 as substitutes for the electrodes 13 and 14 and the electrodes 23 and 24 which are provided on the first and second optical waveguides 4 and 5 in FIG. 1. The configuration of the optical waveguide device of the second exemplary embodiment is the same as that of the optical waveguide device of the first exemplary embodiment, except that the electrodes 41 to 46 are provided as substitutes for the electrodes 13 and 14 and the electrodes 23 and 24.

In FIG. 8, the first optical waveguide 4 is provided with the electrode 41 and the electrode 42 which have substantially the same length. In contrast, the second optical waveguide 5 is provided with the electrode 43 and the electrode 44 which have mutually different lengths in the light traveling direction.

For example, through increasing the length of the electrode 44, there is an advantage in that it becomes unnecessary to heighten the applied voltage when it is needed to give a large loss variation to an area of the electrode 44. As described above, it is not necessary to make the lengths of the electrodes 41 to 44 the same with each other.

Further, through appropriately setting the lengths of the electrodes, it becomes possible to reduce the load of a control circuit for controlling voltages to be applied to the electrodes, and thereby reduce the power consumption of the control circuit.

Further, in FIG. 9, there is illustrated a configuration in which the first optical waveguide 5 is provided with the three electrodes 43, 45 and 46 as control electrodes. V23 is a voltage applied to the electrode 46. In the configuration in which the number of the electrodes is increased, for example, through allowing the electrode 45 and the electrode 46 to be mutually connected and applying the same control voltage to the both electrodes, the electrode 45 and the electrode 46 substantially operate as a control electrode having a length equal to the sum of the lengths of the electrodes. Accordingly, the optical waveguide device having the configuration shown in FIG. 9 makes it possible to perform loss control similar to that of the optical waveguide device shown in FIG. 8.

That is, the optical waveguide device of the second exemplary embodiment makes it possible to, just like the optical waveguide device of the first exemplary embodiment, independently perform control of phase differences and losses given to lights each transmitting through a plurality of optical waveguides, in a simple and easy configuration.

Incidentally, just like in the first optical waveguide 5 of the optical waveguide device shown in FIG. 8 in which the lengths of the electrodes can be freely set, in the first optical waveguide 5 of the optical waveguide device shown in FIG. 9, the number of the electrodes is not limited to three. As described above, the lengths and the number of the electrodes are not limited to those illustrated in FIG. 8 and FIG. 9. Further, when the optical waveguides include a plurality of electrodes, there is no limit in the combination of the electrodes, provided that voltages can be applied to two or more of the electrodes for each of the optical waveguides.

Incidentally, with respect to the optical waveguide device of this second exemplary embodiment, it is also possible to configure an optical modulator by combining this optical waveguide device with the monitoring portions for generating the light absorption electric currents and the control unit for applying the voltages to the electrodes 41 to 46, the monitoring portions and the control unit having been described in the first exemplary embodiment.

Third Exemplary Embodiment

Next, as a third exemplary embodiment to which this device is applied, a configuration that a loss difference between a plurality of optical waveguides is kept constant and amounts of phase variations given to the transmitting lights are controlled will be described.

Figure 10:
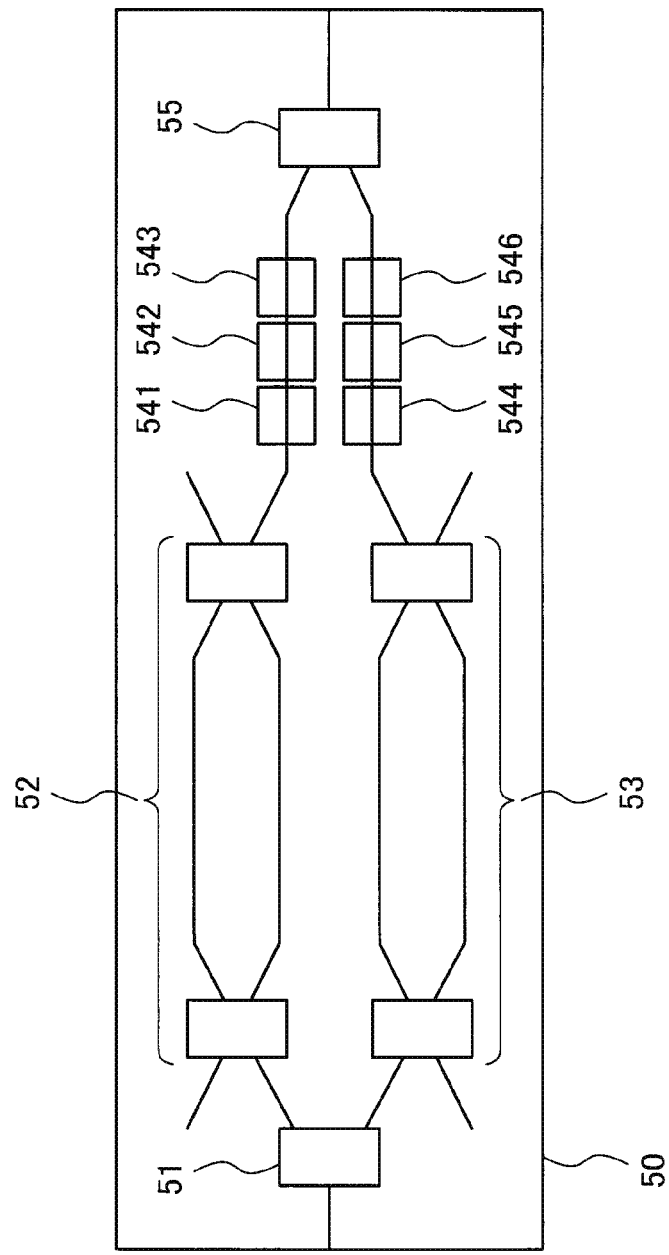

FIG. 10 is a diagram illustrating a configuration of an optical waveguide device of the third exemplary embodiment. The optical waveguide device shown in FIG. 10 is an inphase/quadrature (I/Q) modulator 50 in which two Mach-Zehnder type optical modulators are connected in parallel to each other. The I/Q modulator modulates an I component (a real axis) and a Q component (an imaginary axis) of a light signal independently, superimposes information onto the amplitude and the phase on a complex plane, and performs multi-value modulation.

As shown in FIG. 10, the I/Q modulator 50 includes an optical divider 51, an I modulator 52, a Q modulator 53 and an optical coupler 55. The I modulator 52 and the Q modulator 53 each configure a Mach-Zehnder type optical modulator. Electrodes 541 to 546 are provided between the outputs of the I modulator 52 and the Q modulator 53, and the input of the optical coupler 55.

Lights having been substantially equally divided by the first directional coupler 51 are inputted to the I modulator 52 and the Q modulator 53. The I modulator 52 and the Q modulator 53 modulate the respective received lights independently.

Here, in order to allow the I modulator 52 and the Q modulator 53 to be combined with each other and operate as an I/Q modulator 50, it is necessary to make a phase difference between signals having been modulated by the I modulator 52 and the Q modulator 53 equal to 90 degrees at the inputs of the optical coupler 55. For this reason, in general, a phase shifter for giving a phase shift of 90 degrees is arranged between any one of the I modulator 52 and the Q modulator, and the optical coupler 55.

Nevertheless, giving a phase shift to one of the modulated signals by using a phase shifter formed by a semiconductor optical waveguide simultaneously also causes a loss variation in the modulated signal having been given the phase shift. As a result, a difference arises between the light intensities of the modulated signals inputted to the optical coupler 55.

For this reason, the I/Q modulator 50 includes the electrodes 541 to 546 between the outputs of the I modulator 52 and the Q modulator 53, and the input of the optical coupler 55. Further, the I/Q modulator 50 performs control of the loss and the phase of light by using the electrodes 541 to 546 before allowing the outputs of the I modulator 52 and the Q modulator 53 to be coupled with each other at the optical coupler 55. The electrodes 541, 542, 544 and 545 are control electrodes corresponding to the electrodes 13, 14, 23 and 24 shown in FIG. 1, respectively.

In the first and second exemplary embodiments, control for making an amount of a loss variation given to each of the lights equal to a desired value under the state where an amount of a phase variation given to each of the lights is kept constant has been described. In the third exemplary embodiment, control is performed such that, under the state where a total loss variation amount of each of the lights is kept constant, a desired phase difference can be obtained between the lights.

In FIG. 7, when varying a voltage along one of the isopleths whose total amount of Δα is constant, the locus moves across the isopleth on which Δn is constant. This is the control for varying the phase while keeping the loss constant. That is, it is possible to perform control of voltages to be applied to the electrodes 541, 542, 544 and 545 so that a phase difference between the output of the I modulator 52 and the output of the Q modulator 53 can be 90 degrees while keeping a total amount of Δα constant. Through such control, the I/Q modulator 50 does not cause any loss difference between the output of the I modulator 52 and the output of the Q modulator 53, and at the same time, can give a phase variation difference of 90 degrees between the output of the I modulator 52 and the output of the Q modulator 53. As a result, it is possible to, while keeping the intensities of lights inputted to the optical coupler 55 with respect to the output of the I modulator 52 and the output of the Q modulator 53 constant, make a phase difference between the output of the I modulator 52 and the output of the Q modulator 53 equal to 90 degrees.

In this way, the optical waveguide device of the third exemplary embodiment of the present invention can realize an I/Q modulator capable of minimizing a loss arising when coupling the output of an I modulator and the output of a Q modulator while keeping a phase difference between the output of the I modulator and the output of the Q modulator equal to 90 degrees.

That is, the optical waveguide device of this third exemplary embodiment makes it possible to, just like the optical waveguide device of each of the first and second exemplary embodiments, independently perform control of a phase difference and losses which are given to lights each transmitting through a plurality of optical waveguide devices, in a simple and easy configuration.

Incidentally, the electrodes 543 and 546 are monitor electrodes corresponding to the electrodes 15 and 25 shown in FIG. 1 respectively. It is possible to confirm whether or not the intensities of lights inputted to the optical coupler 55 from the I modulator 52 and the Q modulator 53 are kept equal to each other by monitoring light absorption electric currents arising at the electrode 543 and the electrode 546. Further, when there is any misalignment between the intensities of lights inputted to the optical coupler 55, control of the voltages to be applied to the electrodes 541, 542, 544 and 545 may be performed such that the misalignment between the intensities of lights inputted to the optical coupler 55 are canceled under the state where a phase difference of 90 degrees is kept between the output of the I modulator and the output of the Q modulator.

Moreover, the optical waveguide device of the third exemplary embodiment of the present invention can realize a circuit for controlling the voltages to be applied to the electrodes without increasing the area of a portion occupied by elements with integrating the circuit into a driver for driving the optical modulator.

Further, in the configuration shown in FIG. 10, the optical waveguide device of the third exemplary embodiment of the present invention may be added to the inside of at least one of the I modulator 52 and the Q modulator 53. Through such a configuration, it is possible to perform control so that a loss difference or a phase difference between lights at the inputs of an optical coupler included in at least one of the I modulator 52 and the Q modulator 53 can be equal to a predetermined value. A specific control procedure is the same as that of the first exemplary embodiment, and thus, description of the procedure is omitted here.

Fourth Exemplary Embodiment

Figure 11:
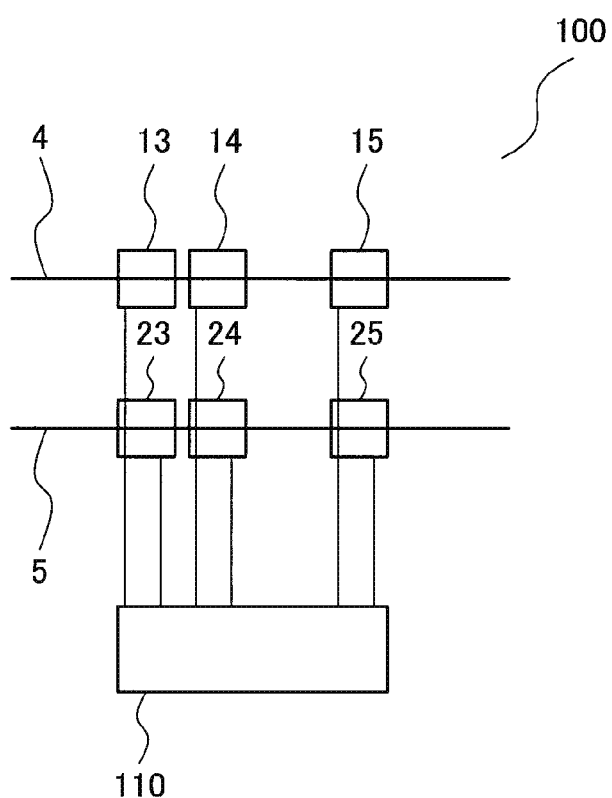
Figure 12:
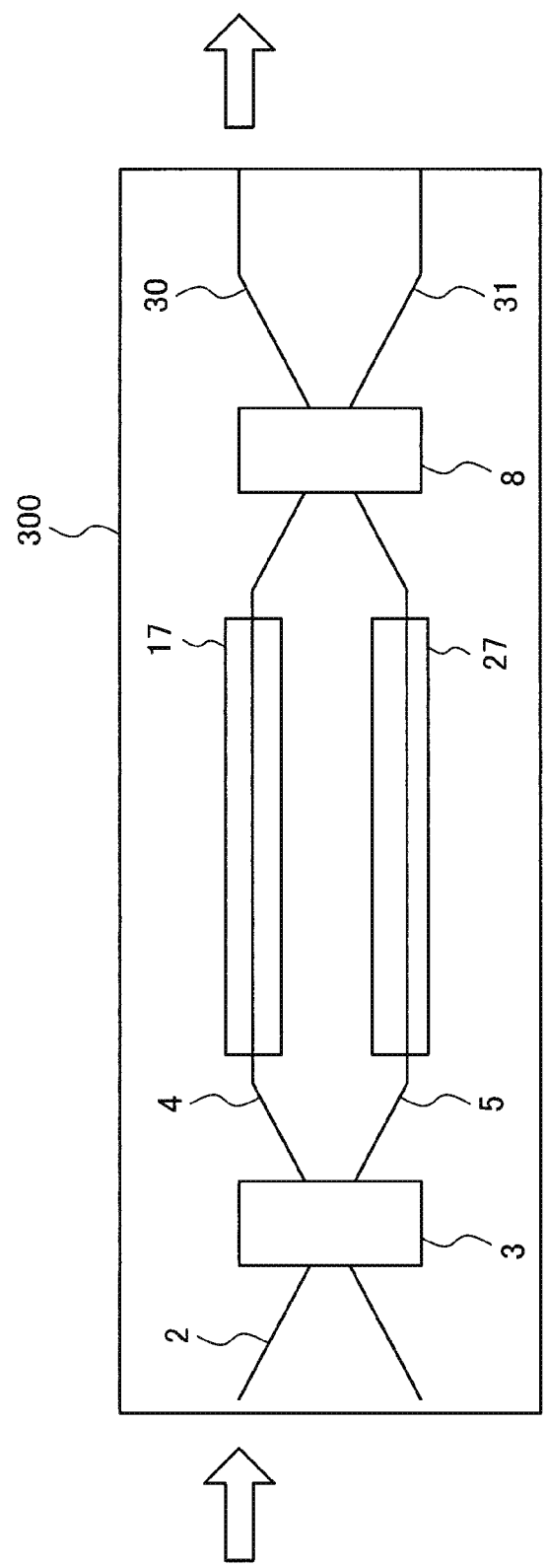

FIG. 11 is a diagram illustrating a configuration of an optical waveguide device of a fourth exemplary embodiment of the present invention. An optical waveguide device 100 includes a first optical waveguide 4, a second optical waveguide 5 and a control circuit 110.

The first optical waveguide 4 and the second optical waveguide 5 include electrodes 13 to 15 and electrodes 23 to 25, respectively. The electrode 15 and the electrode 25 output a light absorption electric current corresponding to the intensity of light transmitting through the first optical waveguide 4 and a light absorption electric current corresponding to the intensity of light transmitting through the second optical waveguide 5, respectively.

The control circuit 110 performs control of a first loss variation and a first phase variation which is caused in light transmitting through the first optical waveguide 4 by voltages applied to the electrode 13 and the electrodes 14. Further, the control circuit 110 performs control of a second loss variation and a second phase variation which is caused in light transmitting through the second optical waveguide 5 by voltages applied to the electrodes 13 and 14.

Then, the control circuit 110 performs control of the voltages to be applied to the electrodes 13, 14, 23 and 24, so as to allow a predetermined relation to arise between the first phase variation and the second phase variation. Alternatively, the control circuit 110 performs control of the voltages to be applied to the electrodes 13, 14, 23 and 24, so as to allow a predetermined relation to arise between the first loss variation and the second loss variation.

Through providing such a configuration, the optical waveguide device 100 makes it possible to, according to the procedure having been described in the first exemplary embodiment, perform control of losses given to the lights transmitting through the first optical waveguide 4 and the second optical waveguide 5 under the state where a phase difference between the lights is kept constant. Moreover, the optical waveguide device 100 also makes it possible to, according to the procedure having been described in the third exemplary embodiment, perform control of a phase difference between the lights transmitting through a corresponding one of the first optical waveguide 4 and the second optical waveguide 5 under the state where a loss given to each of the lights is kept constant.

Further, the control circuit 110 may compare the light absorption electric currents outputted by the electrode 15 and the electrode 25, may calculate the values of voltages to be applied to the electrodes 13, 14, 23 and 24 on the basis of the comparison result, and may output the voltages to the electrodes 13, 14, 23 and 24. That is, in this optical waveguide device 100, it is possible to, just like in the first exemplary embodiment, detect the intensities of lights each transmitting through the first optical waveguide 4 and the second optical waveguide 5 on the basis of the light absorption electric currents. Further, the losses given to the lights each transmitting through the first optical waveguide 4 and the second optical waveguide 5 may be controlled so that a predetermined relation can arise between the light intensities of the lights. The control of the loss is performed on the basis of the voltages each outputted from the electrodes 13, 14, 23 and 24.

As a result, the optical waveguide device of the fourth exemplary embodiment brings about an effect of making it possible to, just like the optical waveguide device of the third exemplary embodiment, independently perform control of a phase difference and losses which are given to lights transmitting through an optical waveguide device, in a simple and easy configuration.

Incidentally, as a modification example of the fourth exemplary embodiment, in FIG. 11, the optical waveguide device 100 may be configured so as to include only the first optical waveguide 4 and the control circuit 110. Further, the first optical waveguide 4 may include only the electrodes 13 and 14. Moreover, the control circuit 110 calculates the values of voltages to be applied to the electrodes 13 and 14 so that the voltages cause a predetermined phase variation and a predetermined loss in the first optical waveguide 4, and outputs signals corresponding to the voltages to the electrodes 13 and 14.

When the optical waveguide device 100 has such a configuration as that of the modification example of the fourth exemplary embodiment, it is also possible to perform control of a loss and a phase of the first optical waveguide 4 through the voltages outputted to the electrodes 13 and 14. In this case, according to the procedure having been described with reference to FIGS. 5 to 7 of the first exemplary embodiment, it is possible to perform control of a loss of light transmitting through the first optical waveguide 4 under the state a phase variation of the light is kept constant. Further, according to the procedure having been described in the third exemplary embodiment, it is also possible to perform control of a phase variation of light transmitting through the first optical waveguide 4 under the state where a loss of the light is kept constant.

Accordingly, this modification example of the fourth exemplary embodiment also brings about an effect of making it possible to independently perform control of a phase difference and a loss of light transmitting through an optical waveguide device in an easy and simple way.

In the first to fourth exemplary embodiments and the modification example of the embodiments described above, control for making a phase difference or a loss difference between lights transmitting a waveguides constant has been mainly described. However, exemplary embodiments of the present invention are not limited to these exemplary embodiments and the modification example of the embodiments. The optical waveguide device having been described in each of the first to fourth exemplary embodiments makes it possible to cause both of a phase and a loss to simultaneously and independently vary, and thus, makes it possible to perform control so that each of a phase variation and a loss variation can be set to a desired value.

Hereinbefore, the present invention has been described with reference to exemplary embodiments, but it is to be noted that the present invention is not limited to the aforementioned exemplary embodiments. The configuration and details of the present invention may be subjected to various modifications understandable by those skilled in the art within a scope not departing the gist of the present invention.

This application is based upon and claims the benefit of priority from Japanese Patent Application No. 2011-123204, filed on Jun. 1, 2011, the disclosure of which is incorporated herein in its entirety by reference.

(Supplementary Note 1)

An optical waveguide device comprising:

an optical waveguide provided with two electrodes each supplied with a corresponding one of two signals; and control means for controlling the two signals so as to cause a phase variation and a loss variation of lights transmitting through the optical waveguide to each have a predetermined value by the two signals.

(Supplementary Note 2)

The optical waveguide device according to supplementary note 1, further comprising monitoring means for outputting a monitor signal in accordance with an intensity of the light transmitting through the optical waveguide, wherein the control means controls the two signals on the basis of the monitor signal.

(Supplementary Note 3)

An optical waveguide device comprising:

a first optical waveguide provided with a first electrode and a second electrode which are supplied with a first signal and a second signal, respectively, each for controlling a phase and a loss of inputted first light;

a second optical waveguide provided with a fourth electrode and a fifth electrode which are supplied with a fourth signal and a fifth signal, respectively, each for controlling a phase and a loss of inputted second light; and a control means for generating the first, second, fourth and fifth signals so as to cause a predetermined relation to arise either a first loss variation caused in light transmitting through the first optical waveguide by the first signal and the second signal and a second loss variation caused in light transmitting through the second optical waveguide by the fourth signal and the fifth signal or a first phase variation caused in the light transmitting through the first optical waveguide by the first signal and the second signal and a second phase variation caused in the light transmitting through the second optical waveguide by the fourth signal and the fifth signal.

(Supplementary Note 4)

The optical waveguide device according to supplementary note 3, wherein the control means generates the first, second, fourth and fifth signals so as to cause the first loss variation and the second loss variation, or the first phase variation and the second phase variation to be equal to each other.

(Supplementary Note 5)

The optical waveguide device according to supplementary note 3 or supplementary note 4, further comprising monitoring means for outputting a third signal and a sixth signal corresponding to intensities of the light transmitting through the first optical waveguide and the light transmitting through the second optical waveguide, respectively, wherein the control means controls the first loss variation and the second loss variation on the basis of the third signal and the sixth signal.

(Supplementary Note 6)

The optical waveguide device according to supplementary note 5, wherein the control means controls the first loss variation and the second loss variation so as to cause the lights transmitting through the first optical waveguide and the light transmitting through the second optical waveguide to have the respective intensities equal to each other.

(Supplementary Note 7)

The optical waveguide device according to supplementary note 5 or supplementary note 6, wherein the first monitoring means and the second monitoring means include a third electrode and a sixth electrode which generate the third signal and the sixth signal by absorbing the light transmitting through the first optical waveguide and the light transmitting through the second optical waveguide, respectively.

(Supplementary Note 8)

The optical waveguide device according to any one of supplementary notes 3 to 7, wherein the control means includes:

first storage means for storing first characteristic data which indicates a relation between a voltage of the first signal and a voltage of the second signal, and a phase variation and a loss variation of the light transmitting through the first optical waveguide;

second storage means for storing second characteristic data which indicates a relation between a voltage of the fourth signal and a voltage of the fifth signal, and a phase variation and a loss variation of the light transmitting through the second optical waveguide; and arithmetic operation means for calculating each voltage of the first, the second, the fourth and the fifth signal on the basis of the first characteristic data and the second characteristic data so as to cause the first loss variation and the first phase variation and to cause the second loss variation and the second phase variation.

(Supplementary Note 9)

An optical interferometer comprising:

dividing means for dividing input light into first light and second light;

the optical waveguide device according to any one of supplementary notes 3 to 8, to which the first light and the second light are inputted; and coupling means for coupling lights outputted from the optical waveguide device, and outputting resultant coupled lights.

(Supplementary Note 10)

A control circuit for an optical waveguide device outputting the first, second, fourth and fifth signals to an optical waveguide device including a first optical waveguide provided with a first electrode and a second electrode which are supplied with a first signal and a second signal, respectively, and a second optical waveguide provided with a fourth electrode and a fifth electrode which are supplied with a fourth signal and a fifth signal, respectively so as to make predetermined relation of any one of a first loss variation and a second loss variation, and a first phase variation and a second phase variation, the first loss variation being a loss variation caused in light transmitting through the first optical waveguide by the first signal and the second signal, the second loss variation being a loss variation caused in light transmitting through the second optical waveguide by the fourth signal and the fifth signal, the first phase variation being a phase variation caused in the light transmitting through the first optical waveguide by the first signal and the second signal, the second phase variation being a phase variation caused in the light transmitting through the second optical waveguide by the fourth signal and the fifth signal.

(Supplementary Note 11)

A control method for an optical waveguide device, comprising:

performing control so as to cause two signals each applied to a corresponding one of two electrodes included in an optical waveguide to give a predetermined phase variation and a predetermined loss variation to light transmitting through the optical waveguide.

(Supplementary Note 12)

An optical interferometer including:

an input optical waveguide to which input light is inputted; a first optical interferometer; a second optical interferometer;

an optical divider for dividing the input light into first light and second light which are outputted to the first optical interferometer and the second interferometer, respectively;

an optical coupler for coupling a light signal outputted from the first optical interferometer and a light signal outputted from the second optical interferometer, and outputting a coupled signal; and the optical waveguide device according to any one of supplementary note 3 to 8, wherein the first optical waveguide and the second optical waveguide included in the optical waveguide device are connected in series to the first optical interferometer and the second interferometer, respectively.

(Supplementary Note 13)

The optical interferometer according to supplementary note 12, wherein the first optical interferometer and the second optical interferometer each further include two optical waveguides arranged in parallel with each other and the optical waveguide device according to any one of supplementary notes 1 to 4, and the first optical waveguide and the second optical waveguide of the optical waveguide device in each of the first optical interferometer and the second optical interferometer are each connected in series to a corresponding one of the two optical waveguides arranged in parallel with each other.

REFERENCE SIGNS LIST 1, 100, 300 Optical modulator
2 Light input port
3, 51 Optical divider
4 First optical waveguide
5 Second optical waveguide
8, 55 Optical coupler
10-15, 20-25, 41-46, 541-546 Electrode
16, 26 TIA
30 First optical output port
31 Second optical output port
32 Differential amplifier
33 A/D converter
34 DSP
35, 37 Driver
36 Modulation circuit
41-46 Control electrode
50 I/Q modulator
52 I modulator
53 Q modulator
110 Control circuit

The invention claimed is:

1. An optical waveguide device comprising:
   an optical waveguide provided with two electrodes each supplied with a corresponding one of two signals;
   a control unit that controls the two signals so as to cause a phase variation and a loss variation of lights transmitting through the optical waveguide to each have a predetermined value by the two signals; and
   a monitoring unit that outputs a monitor signal in accordance with an intensity of the lights transmitting through the optical waveguide,
   wherein the control unit controls the two signals on the basis of the monitor signal.

2. An optical waveguide device comprising:
   a first optical waveguide provided with a first electrode and a second electrode which are supplied with a first signal and a second signal, respectively, each for controlling a phase and a loss of inputted first light;
   a second optical waveguide provided with a fourth electrode and a fifth electrode which are supplied with a fourth signal and a fifth signal, respectively, each for controlling a phase and a loss of inputted second light; and
   a control unit that generates the first, second, fourth and fifth signals so as to cause a predetermined relation to arise between:
      a first loss variation caused in light transmitting through the first optical waveguide by the first signal and the second signal and a second loss variation caused in light transmitting through the second optical waveguide by the fourth signal and the fifth signal or
      a first phase variation caused in the light transmitting through the first optical waveguide by the first signal and the second signal and a second phase variation caused in the light transmitting through the second optical waveguide by the fourth signal and the fifth signal.

3. The optical waveguide device according to claim 2, wherein the control unit generates the first, second, fourth and fifth signals so as to cause the first loss variation and the second loss variation, or the first phase variation and the second phase variation to be equal to each other.

4. The optical waveguide device according to claim 2, further comprising a monitoring unit that outputs a third signal and a sixth signal corresponding to intensities of the light transmitting through the first optical waveguide and the light transmitting through the second optical waveguide, respectively,
   wherein the control unit controls the first loss variation and the second loss variation on the basis of the third signal and the sixth signal.

5. The optical waveguide device according to claim 4, wherein the monitoring unit includes a third electrode and a sixth electrode which generate the third signal and the sixth signal by absorbing the light transmitting through the first optical waveguide and the light transmitting through the second optical waveguide, respectively.

6. The optical waveguide device according to claim 2, wherein the control unit includes:
   a first storage unit that stores first characteristic data which indicates a relation between a voltage of the first signal and a voltage of the second signal, and a phase variation and a loss variation of the light transmitting through the first optical waveguide;
   a second storage unit that stores second characteristic data which indicates a relation between a voltage of the fourth signal and a voltage of the fifth signal, and a phase variation and a loss variation of the light transmitting through the second optical waveguide; and
   an arithmetic operation unit that calculates each voltage of the first, the second, the fourth and the fifth signal on the basis of the first characteristic data and the second characteristic data so as to cause the first loss variation and the first phase variation and to cause the second loss variation and the second phase variation.

7. A control method for an optical waveguide device, comprising:
   performing control so as to cause two signals each applied to a corresponding one of two electrodes included in an optical waveguide to give a predetermined phase variation and a predetermined loss variation to light transmitting through the optical waveguide;
   outputting a monitor signal in accordance with an intensity of the light transmitting through the optical waveguide; and
   controlling the two signals on the basis of the monitor signal.

* * * * *